United States Patent
Tiihonen et al.

(10) Patent No.: US 6,771,619 B2
(45) Date of Patent: Aug. 3, 2004

(54) AUTOMATIC DETECTION AND MODIFICATION OF CHANNEL USAGE IN TDMA WIRELESS COMMUNICATION NETWORKS

(75) Inventors: Juha Tiihonen, Espoo (FI); Tommi Parkkari, Helsinki (FI)

(73) Assignee: Nokia Corporation, Espoo (FI)

( * ) Notice: Subject to any disclaimer, the term of this patent is extended or adjusted under 35 U.S.C. 154(b) by 561 days.

(21) Appl. No.: 09/782,032

(22) Filed: Feb. 14, 2001

(65) Prior Publication Data

US 2002/0110110 A1 Aug. 15, 2002

(51) Int. Cl.[7] ................................................ H04Q 7/00
(52) U.S. Cl. ...................................... 370/329; 370/341
(58) Field of Search ................................ 370/329, 328, 370/332, 333, 338, 341, 431, 437, 466, 321, 337, 347

(56) References Cited

U.S. PATENT DOCUMENTS 6,112,084 A * 8/2000 Sicher et al. ................. 455/426
6,148,010 A * 11/2000 Sutton et al. ................. 370/536
6,181,686 B1 * 1/2001 Hamalainen et al. ........ 370/347

FOREIGN PATENT DOCUMENTS

WO        9610320       4/1996     ............ H04Q/7/22

* cited by examiner

Primary Examiner—Kenneth Vanderpuye
(74) Attorney, Agent, or Firm—Brown Raysman Millstein Felder and Steiner

(57) ABSTRACT

A mobile switching center switches telephone calls in a time division multiplex access wireless communications network architecture. A communications controller in the mobile switching center is adapted to control communications between the mobile switching center and at least one base station controller. An interworking function in the mobile switching center is adapted to transfer information between the mobile switching center and another network other than the wireless communications network. A compact data services unit (CDSU) causes said mobile switching center to automatically detect, whenever a downgrade procedure occurs during a data call switched through said mobile switching center, the subchannels of the telephone call dropped in the downgrade procedure network.

30 Claims, 4 Drawing Sheets

FIG. 4

TSL BITS

| 7 | 6 | 5 | 4 | 3 | 2 | 1 | 0 |
|---|---|---|---|---|---|---|---|
| 1 | 1 | 1 | 1 | 1 | 1 | X | X |

X = TSL BITS RESERVED FOR DATA CALL
1 = PERMANENTLY SET TO BINARY '1'

FIG. 5

TSL BITS

| 7 | 6 | 5 | 4 | 3 | 2 | 1 | 0 |
|---|---|---|---|---|---|---|---|
| 1 | 1 | X | X | Y | Y | Z | Z |

X = TSL BITS RESERVED FOR FIRST SUBCHANNEL
Y = TSL BITS RESERVED FOR SECOND SUBCHANNEL
Z = TSL BITS RESERVED FOR THIRD SUBCHANNEL

FIG. 6

TSL BITS

| 7 | 6 | 5 | 4 | 3 | 2 | 1 | 0 |
|---|---|---|---|---|---|---|---|
| 1 | 1 | X | X | 1 | 1 | Z | Z |

X = TSL BITS RESERVED FOR FIRST SUBCHANNEL
Z = TSL BITS RESERVED FOR SECOND SUBCHANNEL

AUTOMATIC DETECTION AND MODIFICATION OF CHANNEL USAGE IN TDMA WIRELESS COMMUNICATION NETWORKS

BACKGROUND

1. Field of the Invention

The present invention relates generally to time division multiplexed access (TDMA) wireless communication networks such as Global System for Mobile communication (GSM) networks. In particular, some aspects of the present invention relate to solutions for adapting to upgrades or downgrades in multi-slot data calls in TDMA wireless communication networks.

2. Discussion of the Related Art

Perhaps the most prevalent type of TDMA wireless communication networks in use today are GSM networks. A GSM network may operate on any one of several different radio bands (also known as the frequency of the network), for example, standard 900 MHz (used mostly in original European GSM networks), 1800 MHz (used mostly in Personal Communications Networks/Digital Communication Systems PCN/DCS in the United Kingdom) and 1900 MHz (used mostly in Personal Communications System PCS in North America). GSM technical standards are provided by the European Telecommunications Standards Institute (ETSI) and can be obtained directly from ETSI via the web site: www.ETSI.fr.

Many GSM networks support the use of multi-mode, multi-frequency or multi-technology mobile stations that are capable of performing many advanced services. GSM mobile stations may combine many advanced services offered by GSM technology with the latest in computers, displays and other technologies. For example, multi-frequency GSM phones may allow a single handset to operate (roam) on GSM systems that have different frequencies, for example standard GSM (900 MHz), DCS (1800 MHz) or US PCS (1900 MHz). Multi-mode GSM phones may allow the same handset to access different radio technologies including Digital European Cordless Telephones (DECT). Multi-technology GSM phones may allow the handset to access and display different information sources (e.g., Internet web browsing).

The major parts of a GSM network are illustrated in FIG. 1. Mobile stations communicate with nearby radio towers called base stations. A plurality of Base Stations (BS) convert the radio signals received from nearby mobile phones through corresponding antenna systems. A Base Station Controller (BSC) coordinates one or more base stations. The BSC typically comprises a control computer, data communication facilities, and multiplexing and demultiplexing equipment. (Only one BSC is shown in FIG. 1 for the sake of clarity. A typical GSM network includes multiples base station controllers.) The base station controllers pass telephone calls from the mobile phones to a switching system called a Mobile-Service Switching Center (MSC). The MSC connects the calls to other mobile stations or routes the call to the public switched telephone network (PSTN) or other type of networks such as the Internet.

The MSC is also connected to several databases that contain customer information to check authorization for services (e.g., voice, messaging, data and image services) and process call features. The Authentication center (AuC) is a database and processing center that is used to validate the identity of mobile phones. The Equipment Identity Register (EIR) is a data base that holds a list of unauthorized (such as stolen) mobile phones. The Group Call Register (GCR) is a network database that holds the attributes for the set-up and processing of voice group and broadcast calls. The Home Location Register (HLR) database holds the detailed subscriber service subscription information. (In GSM networks, the mobile phones contain an electronic card, known as a subscriber identity module (SIM), to identify the subscriber.) The Visitor Location Register (VLR) is a database that holds temporary information about active subscribers that are operating within the control of that particular MSC.

Controllers in the MSC coordinate base stations, switching functions and network inter-connections. Communication controllers combine or demultiplex the channels from high-speed communication links. The A-interface between the MSC and each BSC consists of a Time Division Multiplex (TDM) Pulse Coded Modulation (PCM) digital transmission system. The interworking function (IWF) in the MSC is used to process and adapt information between dissimilar types of network systems. It permits compatibility between different types of networks such as computer networks, messaging services and Internet web servers. In the interface role, the IWF may buffer, filter or convert different types of information.

A GSM network uses a combination of time division multiple access (TDMA) and frequency hopping. One network channel can be made to support multiple data calls by dividing it up into a number of time slots (TSLs) of pre-defined intervals. A call from a mobile phone is typically assigned to one or more time slots. The interval of the time slots is so short that none of the mobile users on the same radio channel notice that they are transmitting or receiving on a fraction of the channel. In this manner, the capacity of the network is significantly increased over standard analog cellular, which requires that an entire channel be assigned for transmission of a call.

However, the channel usage between the base station controller and the MSC may frequently change as the result of new calls, terminated calls, or downgrades or upgrades in calls, particularly multi-slot calls. Traffic channels of a multi-slot data call are delivered within one timeslot in the A-interface, up to 4 subchannels per data call. Initially, subchannels are reserved from the lowest bit of the timeslot (i.e., bit 0) up towards the highest bit of the timeslot (typically, bit 7).

Recent features introduced in GSM networks include downgrades or upgrades for non-transparent multi-slot data calls. In a downgrade, one or more subchannels are taken away from the multi-slot data call and given to another call, thereby reducing congestion in a base station cell. The multi-slot data call continues even though its data rate has been reduced. In an upgrade, more sub-channels are allocated to a data call. When a downgrade or upgrade occurs, any of the subchannels can be affected. While a message is delivered to the MSC/IWF which may indicate the number of dropped subchannels, the message does not indicate which particular subchannels were dropped. There is no possibility of signaling the dropped subchannel numbers from the BSC to the MSC. The dropped subchannel(s) can be any one of the originally used subchannels. Furthermore, if the dropped subchannels cannot be identified, the MSC/IWF may transmit data to subchannels which have been dropped, causing greatly reduced data call performance.

These features may create inefficiencies in channel usage since there is no automatic solution provided in the GSM specifications. Accordingly, there is a need for methods and network equipment which provide for the automatic detection of the dropping of one or more subchannels from a multislot data call and the dropped subchannels (or remaining subchannels), as well as the modification or adaptation of channel usage in a GSM network. However, adding such signaling would necessarily require changes in the GSM specifications, a great deal of testing and difficulties in implementation.

BRIEF SUMMARY

Accordingly, various embodiments of the present invention are directed to a mobile switching center in a GSM network and to methods of automatically detecting and modifying the use of subchannels in a GSM network. In one aspect of the invention, a mobile switching center switches telephone calls in a time division multiplex access wireless communications network architecture. A communications controller in the mobile switching center is adapted to control communications between the mobile switching center and at least one base station controller. An internetworking function in the mobile switching center is adapted to transfer information between the mobile switching center and another network other than the wireless communications network. A compact data services unit (CDSU) causes said mobile switching center to automatically detect, whenever a downgrade procedure occurs during a data call switched through said mobile switching center, the subchannels of the telephone call dropped in the downgrade procedure network.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, wherein:

FIG. 4 illustrates an example of a single slot data call in a GSM network;

FIG. 5 illustrates an example of multi-slot data call, with 3 subchannels, in as GSM network; and FIG. 6 illustrates an example of the multi-slot data call shown in FIG. 3, after the data call has been downgraded and only two subchannels of the original three subchannels remain.

DETAILED DESCRIPTION

The present invention is applicable for use with all types of TDMA wireless communication networks including $2^{nd}$ and $3^{rd}$ generations of GSM networks. For example, GSM networks include GSM 900, GSM 1800 and GSM 1900 (also known as PCS-1900). $3^{rd}$ generation GSM networks include data networks using General Packet Radio Service (GPRS) technology for mobile data networking services and personal multimedia services, and Enhanced Data Rates for Global Evolution (EDGE) technology for high bit rate data services. GPRS technology is used in GSM networks to enable users to connect at higher data rates and make applications such as wireless email and web-browsing easier and more useful. EDGE networks and/or Wideband CDMA (hereinafter called 3G WCDMA) networks can be used to further boost the data speeds and allow video and mobile multimedia applications with data rates as high as 473 kbps. However, for the sake of simplicity, discussions will concentrate mainly on a $2^{nd}$ or $3^{rd}$ generation GSM network and on circuit switched data calls.

Typical interface types for the GSM network may be used to establish connection between the mobile phones, base stations, base station controllers, and the Mobile Switching Center (MSC). For example, the radio (Um) interface may be used for radio interconnection between the mobile phones and the base stations. The A-bis interface may be used for interconnection between a plurality of base stations and a base station controller. The A interface may be used for interconnection between the base station controller and the MSC. A and A-bis interfaces are usually embodied in a digital link via wire, optical fiber, or microwave radio, and use packet messages that conform to SS7 (Signaling System #7) connection protocols.

The A-interface is a PCM interface where one timeslot is typically reserved for one call independently of the call type (either single-slot or multi-slot). A single-slot call uses only one timeslot at the radio (Um) interface. A multi-slot data call uses two to four timeslots at the radio (Um) interface. Every radio interface timeslot requires 16 kbit/sec capacity at the A-interface. Since the A-interface is typically made up of 64 kbit/sec timeslots, it is possible to use 4 radio interface timeslots per circuit switched data call.

Figure 1:
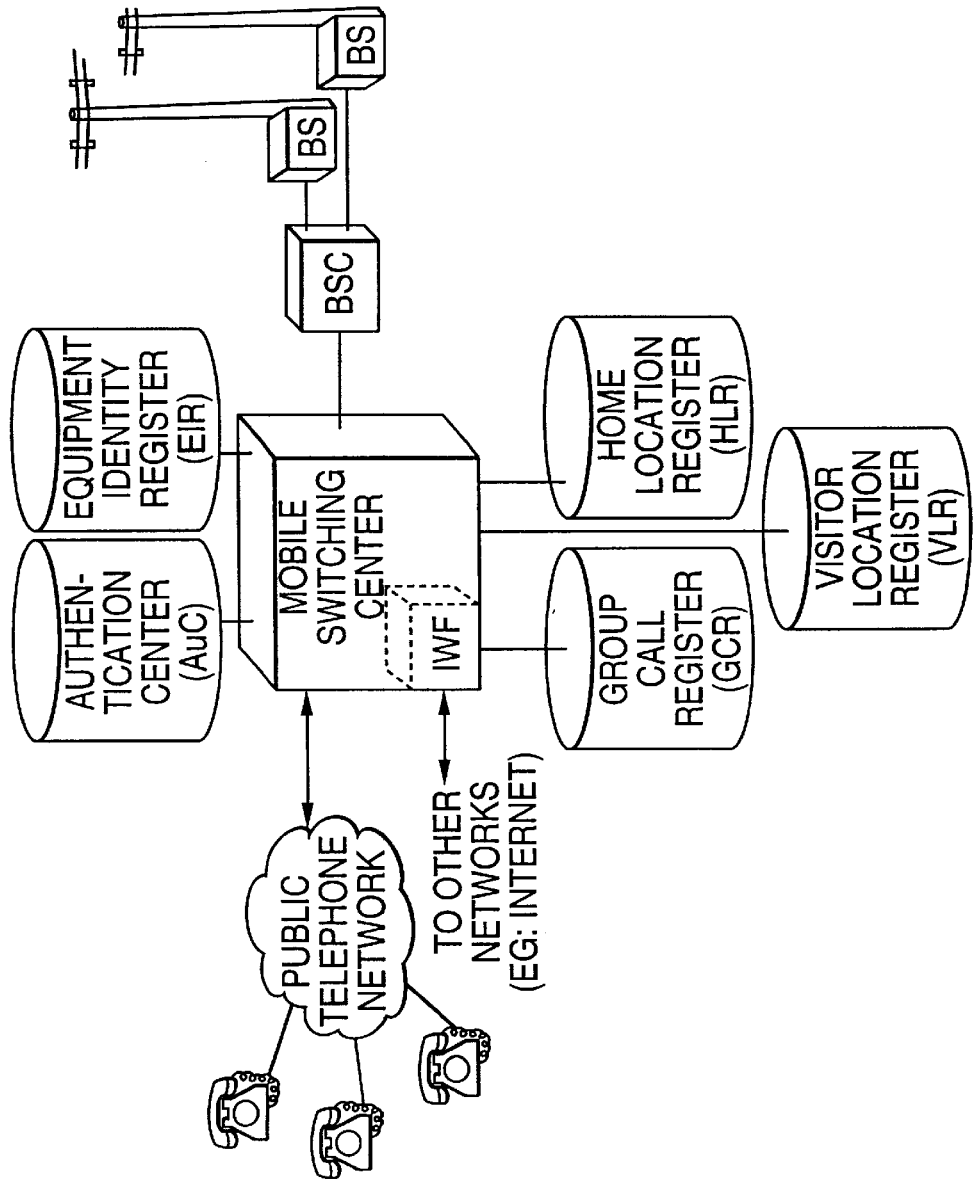
FIG. 1 is a prior art illustration of the major components of a GSM network.
Figure 2:
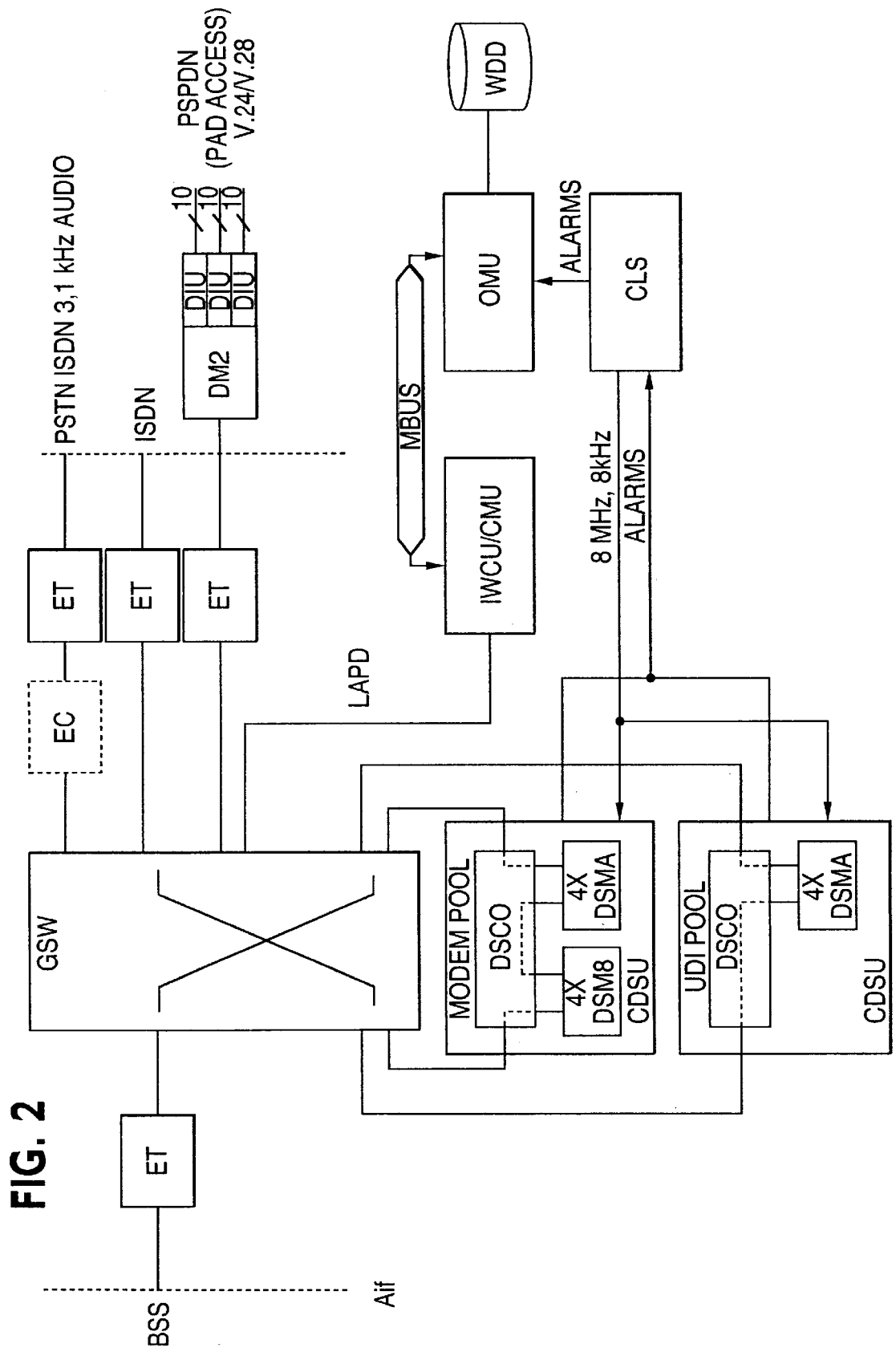
FIG. 2 is a block diagram of the units of a mobile switching center provided to carry out methods of the example embodiments of the invention.
Figure 3:
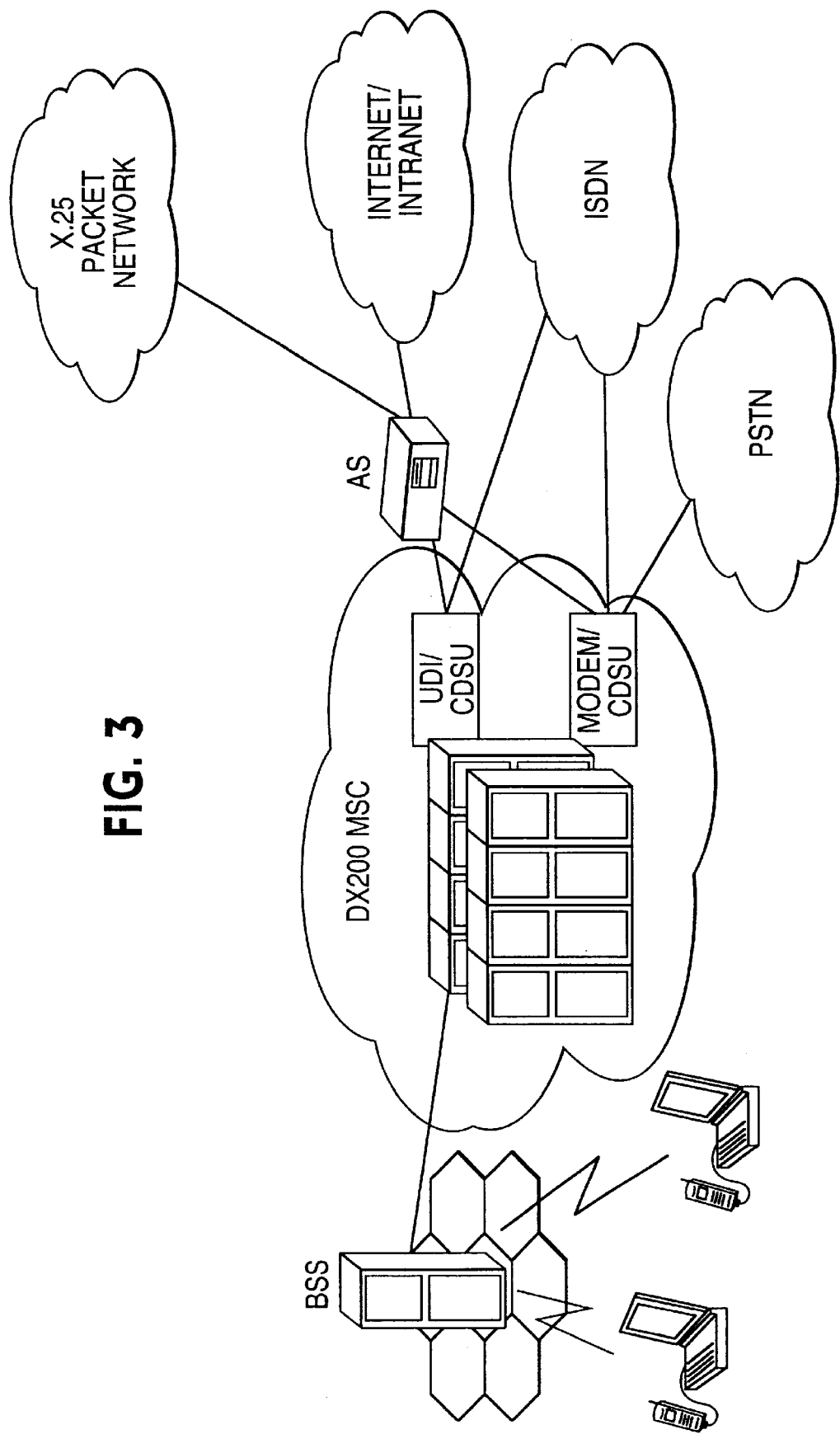
FIG. 3 illustrates a mobile data solution utilizing CDSU based IWF pools to provide data communications between mobile equipment and several disparate networks

FIG. 2 illustrates the connection of the A-interface to the units of an exemplary mobile switching center. Data from the mobile (not shown in FIG. 2) is received from the A-interface via an Exchange Terminal (ET) to a Group Switch (GSW). The GSW switches a call's timeslot into a Compact Data Services Unit (CDSU), which may be either a UDI pool or a modem pool. The UDI pool/CDSU or modem pool/CDSU converts user data into a fixed network protocol and it goes via GSW to PSTN/ISDN 3, 1 kHz audio (through an echo canceller (EC or ECU) and Exchange Terminal). Either one or both of the UDI pool/CDSU or modem pool/CDSU may use internal PCM for incoming and outgoing traffic (2*4 Mbits/sec). The Exchange Terminal converts PSTN/ISDN PCM format back to G.703 format, and this PCM is connected towards the other end. The data may also go to an ISDN (through ET) or DM2 (through ET) network. Data from the networks to the mobile goes in the opposite direction. FIG. 3 illustrates a mobile data solution utilizing these CDSU based IWF pools to provide data communications between mobile equipment (for example, a laptop computer with connected mobile phone) and several disparate networks. Although a X.25 packet network, Internet/Intranet, ISDN and PSTN are shown in FIG. 3, other networks and combinations of networks may be connected.

The DSCO, DSMA and DSM8 in the UDI pool/CDSU and modem pool/CDSU perform the interworking functions. As alluded to above, the Exchange Terminal performs conversion from external PCM in the G.703 format to an internal PCM format, which may be unique to the MSC and handled exclusively inside the MSC. The Echo Canceller (EC or ECU) is a known unit for voice circuits and is bypassed in data calls. The Group Switch is a switching matrix or switching network which performs switching between PCMs and timeslots. In other words, input PCM/timeslot combinations can be switched to desired output PCM/timeslots. Although not shown in FIG. 2, a DASUC pool may be looped through the GSW (with an ET for outgoing traffic). The IWCU/CMU (the IWCU may be in a subrack and the CMU may be in a cartridge), OMU, CLS and WDD are known computer (or interface) units which perform their specific functions, which are not directly related to GSM data calls. There may also be a BSU unit (not shown in FIG. 2), known in the art, connected between the GSW and the MBUS.

In a normal (single-slot) GSM data call, 16 kbit/s capacity is required at A-interface. This capacity is achieved by using the two lowest bits of the timeslot for data transfer, leaving the upper six bits unused (left to binary 1). See FIG. 4. Because the place of used bits is defined, and the number of radio channels is not changed, the 16 kbit/s data connection at the A-interface stays at the same place during a call.

In a multi-slot data call, 2 to 4 timeslots are used in the radio interface. In the A-interface, 16 kbit/sec capacity is required for every subchannel (Um timeslot). For example, if 3 radio timeslots are used, then 3*16 kbit/s capacity is required in the A-interface for the call. Every timeslot in radio (Um) interface is mapped into 2 bits of the A-interface timeslot, as shown in FIG. 5. Every 2 bit group reserved for a call is called a "subchannel". When a call is started, used subchannels are placed consecutively starting from the lowest bits. Due to this, places of subchannels in a timeslot is known, if the number of timeslots is known. No subchannels in the A-interface have priority over other subchannels, they are equal to each other in priority.

If a downgrade procedure occurs, one (or more) radio timeslots are dropped from the call, then one used subchannel will drop at the A-interface. If an upgrade procedure occurs, one (or more) radio timeslots are additionally allocated to the call, then one subchannel will be added at the A-interface. The BS/BSC which drops the radio timeslot (in the case of a downgrade) or allocates the radio timeslot (in the case of a downgrade) will tell the MSC/IWF about the amount of change in the radio timeslot. But the BS/BSC will not indicate which radio timeslot was dropped or added, only the new amount of timeslots. It is possible that any of the used radio subchannels will be dropped or added. This is caused by the GSM specifications, which specify that BS/BSC only needs to indicate the new radio timeslot amount, it is not possible to know which radio subchannel was dropped or added.

FIG. 6 shows the circumstance where a radio timeslot "yy" has been dropped from a call due to a downgrade procedure. In this case, the MSC/IWF is informed that the used radio timeslot amount has been dropped to two timeslots. Because the dropped radio timeslot is not known, a method is required to find out which radio timeslot has been dropped.

When a downgrade procedure occurs, then one or more of the used subchannels will be dropped from the data call. The new amount of subchannels is signaled to the MSC/IWF, but not information indicating which subchannel(s) is dropped. In unused subchannels, no specific data is sent. Only timeslots containing an idle sequence (FFh) are sent. When a downgrade procedure occurs and one or more subchannels are dropped, the transcoder changes contents of the subchannel to be an idle sequence.

The MSC/IWF will start a subchannel finding procedure whenever it receives signaling of a downgrade or upgrade event. It will start frame sync finding from all possible subchannels from the transcoder direction. The subchannel finding procedure is completed when valid frame synchronization is found on all used subchannels (amount of used subchannels is signaled to MSC/IWF). Subchannels may be found in any of the four possible subchannel physical places.

This method is preferably implemented directly in the software of the MSC/IWF, such as a Compact Data Services Unit (CDSU). With such an implementation there is no need to change the GSM specifications and no need for changes to the software of the base station controller. It thus has disadvantages over a method in which information is sent in a message to the MSC/IWF.

When a downgrade or upgrade event is signaled to MSC/IWF and correct places of the subchannels is not known, the MSC/IWF will use the lowest physical subchannels as Transmit Subchannels in the transcoder direction as a default value. Those default subchannels may be, or may not be, the actual used subchannels. When the MSC/IWF has found the valid frame synchronization from all used subchannels from the transcoder direction, then transmit subchannels can be switched to correct ones.

Although a method according to the example embodiment of the invention is described according to the A-interface and radio interface of a GSM network, the invention may be practiced in other networks with different data rates and different interfaces, such as in the Universal Mobile Telecommunications system (UMTS). For the view of the IWF, there is only one channel in a call, and different data rates are achieved by different user data/fill data rates.

While the foregoing has described what are considered to be example embodiments of the present invention, it is to be understood by those skilled in the art that various changes and modifications may be made therein and that the invention may be implemented in various forms and embodiments, and that it may be applied in numerous applications, only exemplary ones of which have been described herein. Further, modifications may be made to adapt a particular environment to the teachings of the present invention without departing from the central scope of the present invention. Therefore, it is intended the present not be limited to the particular embodiments disclosed herein.

What is claimed is:

1. A mobile switching center for a time division multiplex access wireless communications network architecture, comprising:

a communications controller adapted to control communications between the mobile switching center and at least one base station controller;

an interworking function adapted to transfer information between the mobile switching center and another network other than the wireless communications network; and a compact data services unit (CDSU), said CDSU causing said mobile switching center to automatically detect, whenever a downgrade procedure occurs during a data call switched through said mobile switching center, the subchannels of the telephone call dropped in the downgrade procedure.

2. The mobile switching center recited in claim 1, wherein the mobile switching center initiates a subchannel finding procedure whenever a downgrade procedure occurs during a data call switched through said mobile switching center.

3. The mobile switching center recited in claim 2, wherein the subchannel finding procedure includes frame synchronization finding for all possible subchannels.

4. The mobile switching center recited in claim 3, wherein the mobile switching center uses the lowest physical subchannels as transmit channels during the subchannel finding procedure.

5. The mobile switching center recited in claim 4, wherein the subchannel finding procedure is terminated when valid frame synchronization is found on all used subchannels.

6. The mobile switching center recited in claim 5, wherein the transmit channels are switched when valid frame synchronization is found for all used subchannels.

7. The mobile switching center recited in claim 1, wherein idle sequences are sent in unused subchannels.

8. The mobile switching center recited in claim 1, wherein the TDMA wireless communication network is a GSM network.

9. A mobile switching center for a time division multiplex access wireless communications network architecture, comprising:

a communications controller adapted to control communications between the mobile switching center and at least one base station controller;

an interworking function adapted to transfer information between the mobile switching center and another network other than the wireless communications network; and a compact data services unit (CDSU), said CDSU causing said mobile switching center to automatically detect, whenever an upgrade procedure occurs during a data call switched through said mobile switching center, the subchannels of the telephone call added in the upgrade procedure.

10. The mobile switching center recited in claim 9, wherein the mobile switching center initiates a subchannel finding procedure whenever an upgrade procedure occurs during a data call switched through said mobile switching center.

11. The mobile switching center recited in claim 10, wherein the subchannel finding procedure includes frame synchronization finding for all possible subchannels.

12. The mobile switching center recited in claim 11, wherein the mobile switching center uses the lowest physical subchannels as transmit channels during the subchannel finding procedure.

13. The mobile switching center recited in claim 12, wherein the subchannel finding procedure is terminated when valid frame synchronization is found on all used subchannels.

14. The mobile switching center recited in claim 13, wherein the transmit channels are switched when valid frame synchronization is found for all used subchannels.

15. The mobile switching center recited in claim 9, wherein idle sequences are sent in unused subchannels.

16. The mobile switching center recited in claim 9, wherein the TDMA wireless communication network is a GSM network.

17. A method of automatically detecting changes in the channel usage over an interface between a mobile switching center and a base station controller in a TDMA wireless communication, said method comprising the steps of:

automatically detecting, whenever a downgrade procedure occurs during a data call switched through said mobile switching center, the subchannels of the telephone call dropped in the downgrade procedure; and initiating a subchannel finding procedure whenever a downgrade procedure occurs during a data call switched through said mobile switching center.

18. The method recited in claim 17 wherein the subchannel finding procedure includes frame synchronization finding for all possible subchannels.

19. The method recited in claim 17, wherein the lowest physical subchannels are used as transmit channels during the subchannel finding procedure.

20. The method recited in claim 18, wherein the subchannel finding procedure is terminated when valid frame synchronization is found on all used subchannels.

21. The method recited in claim 20, wherein the transmit channels are switched when valid frame synchronization is found for all used subchannels.

22. The method recited in claim 21, wherein idle sequences are sent in unused subchannels.

23. The method recited in claim 17, wherein the TDMA wireless communication network is a GSM network.

24. A method of automatically detecting changes in the channel usage over an interface between a mobile switching center and a base station controller in a TDMA wireless communication, said method comprising the steps of:

automatically detecting, whenever an upgrade procedure occurs during a data call switched through said mobile switching center, the subchannels of the telephone call added in the upgrade procedure; and initiating a subchannel finding procedure whenever an upgrade procedure occurs during a data call switched through said mobile switching center.

25. The method recited in claim 24 wherein the subchannel finding procedure includes frame synchronization finding for all possible subchannels.

26. The method recited in claim 24, wherein the lowest physical subchannels are used as transmit channels during the subchannel finding procedure.

27. The method recited in claim 25, wherein the subchannel finding procedure is terminated when valid frame synchronization is found on all used subchannels.

28. The method recited in claim 27, wherein the transmit channels are switched when valid frame synchronization is found for all used subchannels.

29. The method recited in claim 28, wherein idle sequences are sent in unused subchannels.

30. The method recited in claim 17, wherein the TDMA wireless communication network is a GSM network.

* * * * *